Figure 1:
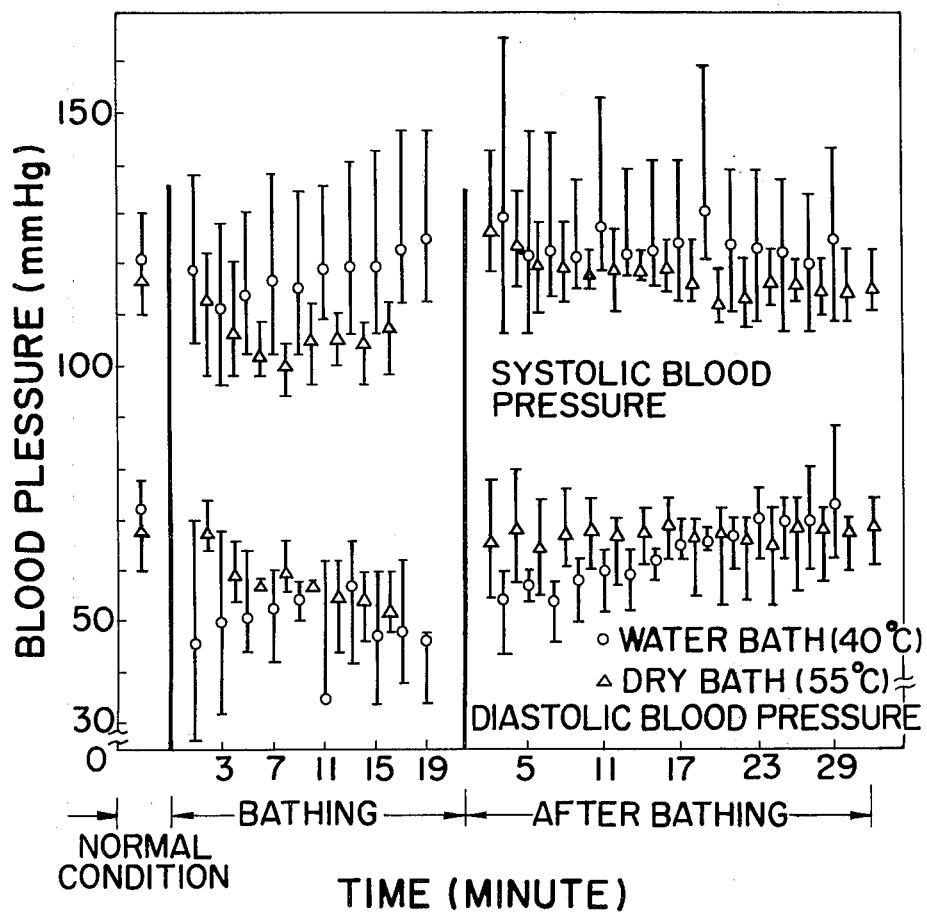

United States Patent [19]
Matsui

[11] 3,929,997
[45] Dec. 30, 1975

[54] BATH COMPOSITION FOR HUMAN BODY
[76] Inventor: Hirofumi Matsui, No. 6-16, Higashi 2-chome, Shibuya-ku, Tokyo, Japan
[22] Filed: Feb. 1, 1974
[21] Appl. No.: 438,670

Related U.S. Application Data
[63] Continuation of Ser. No. 213,428, Dec. 29, 1971, abandoned.

[30] Foreign Application Priority Data
Dec. 31, 1970 Japan............... 45-125709

[52] U.S. Cl.................. 424/195; 424/364
[51] Int. Cl.².......................... A61K 27/00
[58] Field of Search................ 424/364, 195

[56] References Cited
OTHER PUBLICATIONS
Chemical Abstracts, Vol. 48, (1954), 1513–1514.
Agricultural and Food Chemistry, Vol. 9, No. 1, Jan.-Feb., 1961, pp. 9–15.

Primary Examiner—Frederick E. Waddell

[57] ABSTRACT

A powdery bath composition for human body which spontaneously generates a temperature suitable for bathing without the application of any external heat comprising a mixture of 90 to 10% by weight of powdery coffee grounds left after extraction of coffee essence and 10 to 90% by weight of powder of a vegetable material selected from the group consisting of extraction residues of vegetable seeds, defatted vegetables, baggasse, corn core and pineapple stalk, wherein the water content is adjusted to 30 – 50% by weight and the pH value is adjusted to about 5.

4 Claims, 5 Drawing Figures

BATH COMPOSITION FOR HUMAN BODY

This is a continuation of application Ser No. 213,428 filed Dec. 29, 1971 now abandoned.

This invention relates to a novel powdery bath composition for human body and use of thereof. More specifically, this invention relates to a novel bath composition for human body which spontaneously generates a temperature suitable for bathing without the application of any external heat and in which said temperature suitable for bathing can be maintained for a long period of time. More particularly, the invention relates to a powdery bath composition which can be maintained at a temperature suitable for bathing by fermentation heat. This invention relates also to the use of such novel bath composition for bathing of human bodies.

It is an object of this invention to provide a hot bath composition which is maintained at a desired bath temperature by spontaneous heating and which is distinguished from conventional hot baths in that external heating is not required.

Another object of this invention is to provide a novel bath composition which makes bathing possible at temperatures as high as 60°C. without undesirable effects on the human body.

While engaged in research on the utilization of coffee bean grounds from which coffee essence has been extracted, and which are usually thrown away as garbage and cause such trouble as environmental defilement, it was found that the acid value of a coffee bean oil obtained by extracting such coffee bean grounds with a solvent such as acetone and benzene varies widely within a range of from 15 to 90, depending on the coffee bean-parching temperature and time. The origin of this phenomenon was found to be due to the hydrolysis of the coffee bean oil caused by a bacterium belonging to the genus Rhizopus and other bacteria. It was also found that, coincidentally with the hydrolysis of the coffee bean oil, mycological decomposition of carbohydrates such as sugar and dextrin, and proteins occurs and there are formed monosaccharides and amino acids. Still further, it was found that coffee grounds are heated at about 60°C. or higher temperatures by said fermentation.

This invention has been accomplished based on such findings.

In order to use coffee grounds as a bath composition, it is important that fermentation should continued for a long time in coffee grounds. In order to maintain the fermenting state in coffee grounds for a long time, it is necessary to adjust suitably the size, water content and pH value of coffee grounds and impart a good air-permeability to them.

The objects of this invention can be attained by a bath composition comprising a mixture of about 90 to about 10% by weight of powdery coffee ground left after extraction of coffee essence and about 10 to about 90% by weight of powder of a vegetable material selected from the group consisting of extraction residues of vegetable seeds, defatted vegetables, baggasse, corn core and pineapple stalk, wherein the water content is adjusted to 30 – 50% by weight and the pH value is adjusted to about 5.

The powdery vegetable material is a component necessary for imparting a good air-permeability to the composition and supplying nutriments to microorganisms. In a composition of coffee grounds free of such powdery vegetable material, the resulting bath maintains a suitable bath temperature only for a very short period, and it is impossible to maintain a desired bath temperature for a long time. As such powdery vegetable material there may be preferably used powdered defatted soybeans, powdered of defatted cotton seeds, powdered defatted rice bran, baggasse powdered, powder corn core, powdered pineapple stalk and chips of various woods.

The mixing ratio of coffee grounds and such powdery vegetable material should be chosen suitably within the above-mentioned range depending on the kind of the coffee bean, the size of coffee grounds, the desired bath temperature and the desired bath life. For instance, in the case of coffee grounds having a smaller size, it is necessary to blend a powdery vegetable material in an amount of 70 – 90% by weight, and in the case of coarse coffee grounds, it is sufficient to incorporate a powdery vegetable material in an amount of 10 – 30% by weight.

Water is not only necessary for growth of microorganisms but also makes it possible to maintain the bath temperature at a uniform level while generating steam appropriately. Further, water reduces irritation to human body and hence, makes bathing possible even at such high bath temperatures as 60°C. In a hot water bath, however, an appropriate bath temperature is about 42°C. and bathing is impossible at higher temperatures.

In the bath composition of this invention, the pH value is adjusted to about 5 which is very suitable for growth of microorganisms, and at this pH value, therefore, the bath temperature can be maintained at about 60°C. for a long time. Further, this pH value is effective for preventing propagation of saprogenous bacilla and inhibiting generation of offensive ammonium smell from the bath.

Generally, parched coffee beans are milled or powdered into about 65 mesh or about 100 mesh and extracted with hot water, and the extract is served for drinking, while the extraction residue is usually thrown away as coffee grounds. In this invention, ordinary coffee grounds may be used as they are. More specifically, coffee grounds left after extraction of coffee essence are squeezed to remove excessive water and adjust the water content to 40 – 60% by weight, and they are disentangled by passing air therethrough. Then, the disentangled coffee grounds are mixed with the above-mentioned powdery vegetable material and then the mixture is introduced into a bathtub. In about 50 hours, the temperature of the entire composition is raised to about 60°C. and bathing becomes possible.

When a man immerses his body in a bath of the composition of this invention heated at about 60°C. by fermentation heat, the body is uniformly warmed without any irritation being felt. This condition can be maintained for about 100 hours.

When the bath temperature is a little lowered, it may be elevated to about 60°C. again by adding to the bath a small amount of coffee grounds blended with 0.5 – 10% by weight of rice bran and agitating the bath uniformly.

The bath composition of this invention is sufficiently fermented only by actions of microorganisms contained in coffee grounds and the temperature is elevated. However, in case shortening of the initial fermentation period if desired, it is possible to inoculate the bath composition with a strain of Saccharomyces ellipsoideus.

This invention will now be explained in more detail by Examples.

EXAMPLE 1

Coffee grounds left after extraction of coffee essence were compressed to reduce the water content to about 40% by weight, while they were still in the warm state. Nine hundred kilograms (900 kg) of the so compressed coffee grounds were blended with 100 kg of a crushed vegetable material of a water content of about 10% by weight obtained by cutting baggasse, pineapple stalk or corn core into 2 – 3 cm, and the blend was uniformly agitated and its pH was adjusted to about 5. Then, the blend was taken into a bathtub and allowed to stand still. In about 50 hours, there was formed a bath heated at about 60°C.

EXAMPLE 2

Four hundred kilograms (400 kg) of coffee grounds of water content of 40% by weight similar to those used in Example 1 were blended with 40 kg of rice bran and 300 kg of defatted soybeans or defatted cotton seeds, and 300 kg of baggasse was further added thereto. The blend was agitated sufficiently while passing air therethrough, until the average water content became 37% by weight. Then, the composition was introduced into a bathtub and allowed to stand still. In about 50 hours, the temperature was elevated to 60°C.

EXAMPLE 3

Two hundred kilograms (200 kg) of coffee grounds of a water content of 40% by weight similar to those used in preceding Examples were blended with 20 kg of rice bran, and 10 g of a yeast obtained by culturing *Saccharomyces ellipsoideus*, which was dissolved in 100 cc. of water, was inoculated to the above blend. The blend was sufficiently agitated under passage of air and allowed to stand still for about 50 hours. Then the blend was incorporated with 780 kg of wood chips (water content = 35% by weight), and the average water content of the resulting composition was adjusted 37% by weight and the pH was adjusted to about 5. The composition was then taken into a bathtub and allowed to stand still. In about 72 hours, the temperature of the bath composition was elevated to 60°C.

When a body was immersed in a bath containing any of the bath compositions of this invention illustrated in above Examples, the body was heated at a relatively high temperature approximating 60°C., but the body did not feel any irritation by heat such as felt in conventional hot water baths. Accordingly, when the bath composition of this invention is used, there is attained an excellent effect of and relieving fatigue.

Effects or influences of the bath of this invention on human bodies will now be explained by referring to accompanying drawings.

We examined changes in blood pressure, pulse pressure, pulse frequency and skin temperature during bathing and before and after bathing when 89 men took a hot water bath at 40°C. and a bath of this invention at 55°C., respectively. Results are shown in FIGS. 1 to 5.

FIG. 1 illustrates the changes in blood pressure with respect to the bath of this invention and the hot water bath.

As is seen from FIG. 1, in the case of the hot water bath, at the initial stage of bathing, the diastolic blood pressure abruptly decreases and it gradually increases during bathing. After bathing, it sharply rises. On the other hand, in the case of the bath of the present invention any abrupt decrease of the diastolic blood pressure is not observed at the initial stage of bathing but it is gradually lowered during bathing and is gradually heightened after bathing. Further, in the case of the hot water bath, the systolic blood pressure is considerably heightened over the normal level and this change is extreme. In contrast, in the case of the bath of the present invention, the blood pressure is rather lowered during bathing, and this change is very small. This proves that unlike the hot water bath, the present bath places no burden on the heart.

Figure 2:
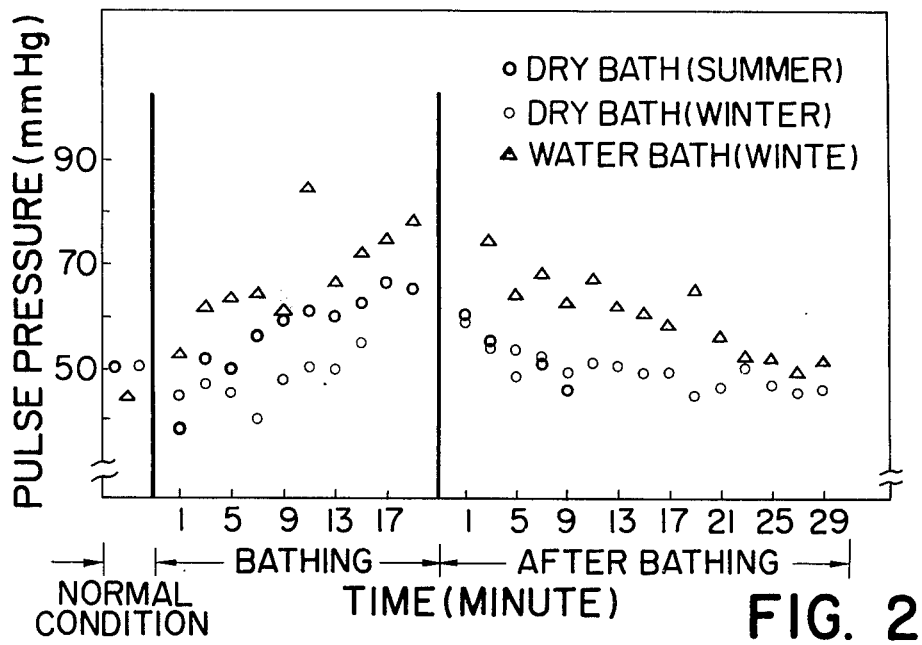

FIG. 2 illustrates changes in the pulse pressure with respect to the present bath and the hot water bath. When these changes are compared with each other, it will readily be understood that in the case of the hot water bath, the pulse pressure is increased by bathing, whereas in the case of the present bath, the increase of the pulse pressure is not so extreme, either in summer or in winter, and the change of the pulse pressure with the lapse of time is very slight.

Figure 3:
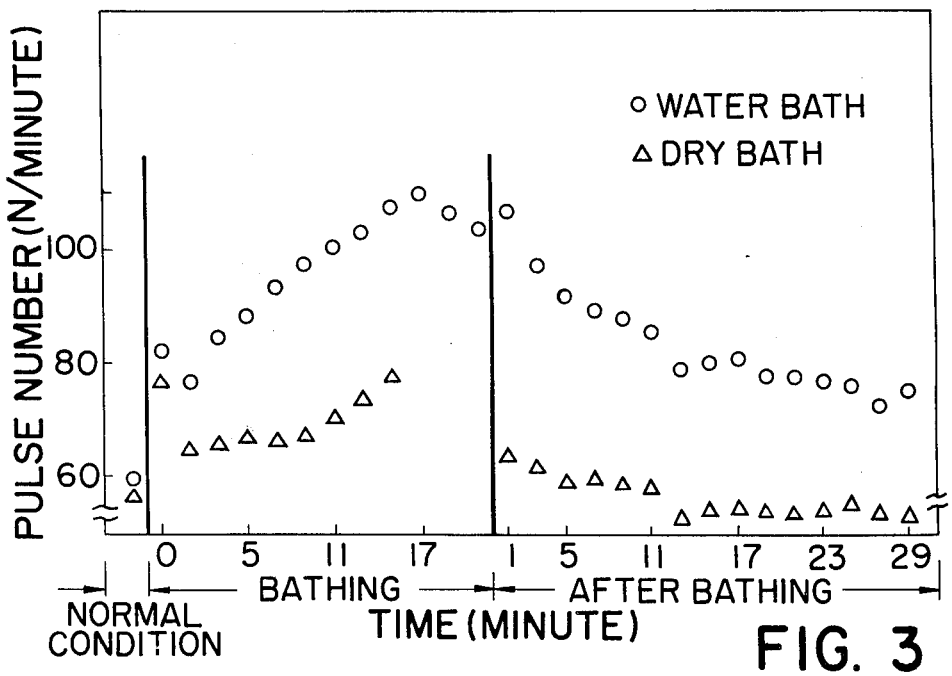

FIG. 3 illustrates changes in the pulse frequency with respect to the hot water bath and the present bath. As is seen from comparison of the data of the hot water bath with those of the present bath, the pulse frequency is extremely increased in the case of the hot water bath, while the pulse frequency hardly changes in the case of the present bath.

Figure 4:
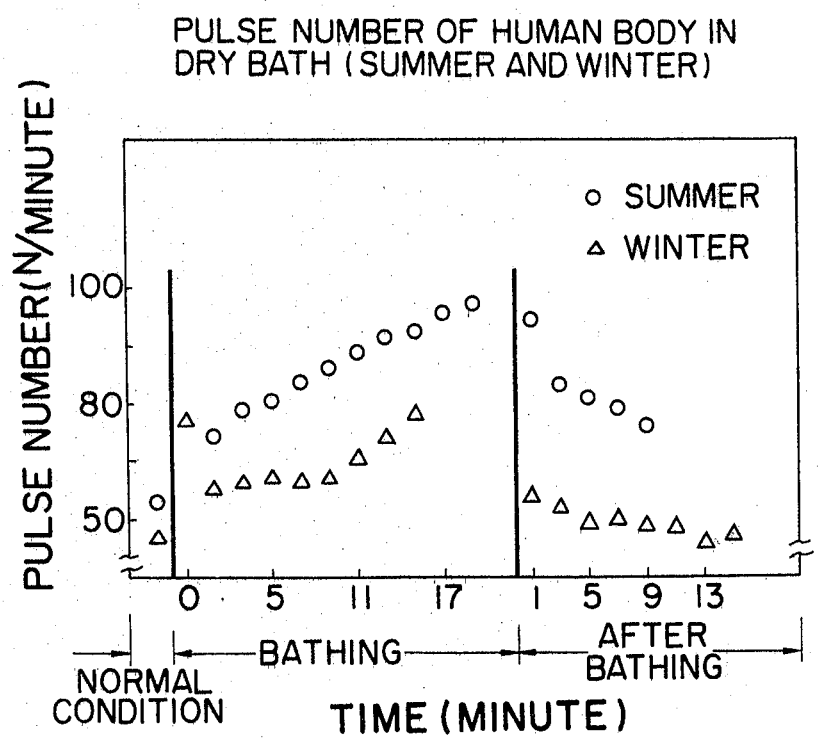

FIG. 4 illustrates changes in the pulse frequency with respect to the present bath taken in winter and taken in summer. From this FIG. 4 it will readily be understood that there is no substantial difference between bathing in summer and bathing in winter with respect to the tendency of the change of the pulse frequency brought about by bathing. This proves that the influence on the heart by the present bath is much smaller than that by the hot water bath.

Figure 5:
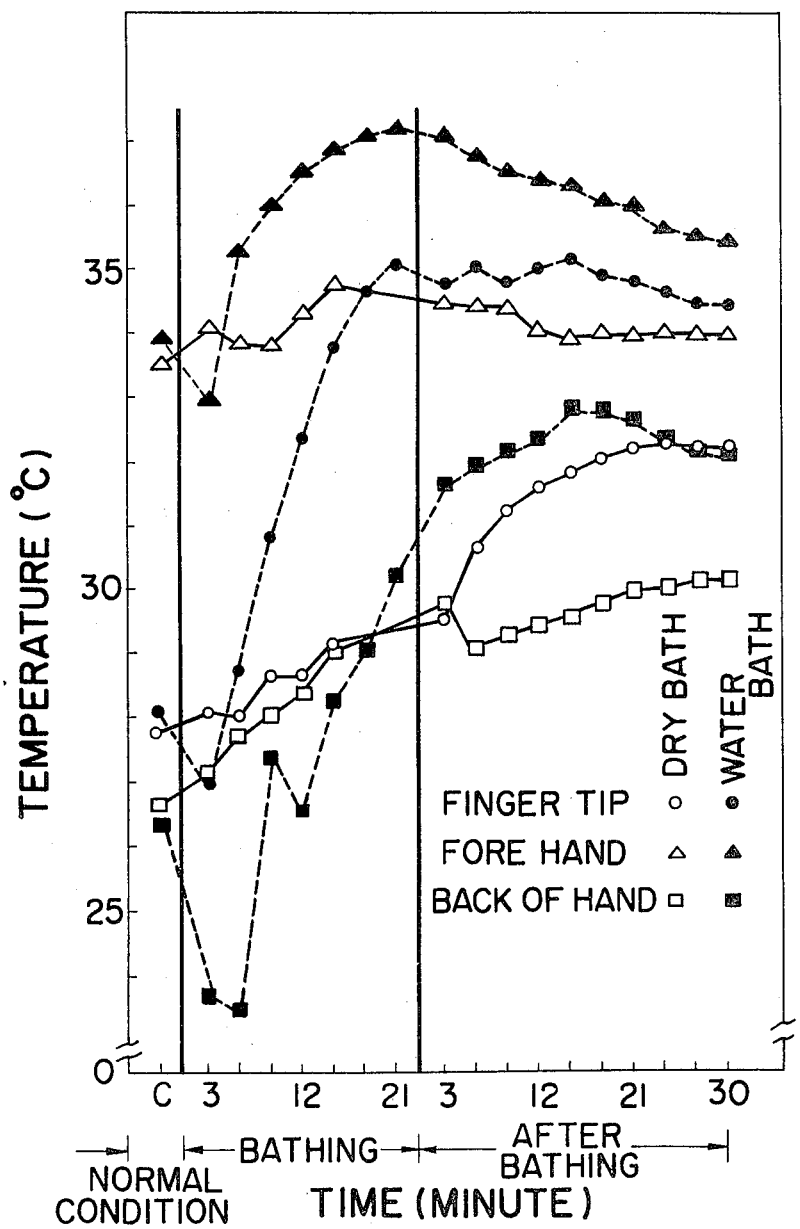

FIG. 5 illustrates changes in the skin temperature with respect to the present bath and the hot water bath. When these changes are compared, it is seen that in the case of the hot water bath, the skin temperature rises abruptly, while the rise of the skin temperature is very gradual in the case of the present bath.

The results illustrated in FIGS. 1 – 5 clearly prove that the present bath places much less burden on the heart than the hot water bath, and warms bodies gradually, and that the present bath exhibits excellent bathing effects over the hot water bath.

What we claim is:

1. A powdery bath composition for human body comprising a mixture of 90 to 10% by weight of powdery coffee grounds left after extraction of coffee essence and 10 to 90% by weight of at least one powder of a vegetable material selected from the group consisting of defatted soybeans, defatted cotton seeds, defatted rice bran, baggasse, corn core and pineapple stalk, wherein the water content is adjusted to 30–50% by weight of the total composition and the pH value is adjusted to about 5 and the temperature is 55° to about 60°C.

2. A bath composition as defined in claim 1 wherein the powdery vegetable material is member selected from the group consisting of powder of defatted rice bran, powder of defatted soybeans and powder of defatted cotton seeds.

3. A process for preparing a powdery bath for human body which comprises blending 90 to 10% by weight of powdery coffee grounds left after extraction of coffee essence and 10 to 90% by weight of at least one powder of vegetable material selected from the group consisting of defatted soybeans, defatted cotton seeds, defatted rice bran, baggasse, corn core and pineapple stalk, adjusting the water content of the blend to 30 to 50% by weight of the blend and the pH value to about 5, and allowing the blend to ferment to generate a bathable temperature of 55° to about 60°C.

4. A process as defined in claim 3 wherein a further mixture of powdery coffee grounds left after extraction of coffee essence and rice bran is mixed with the used bath composition when the temperature decreases to regenerate the dry bath.

\* \* \* \* \*